No. 835,447. PATENTED NOV. 6, 1906.
C. LORENSON.
MOWER.
APPLICATION FILED APR. 8, 1905.
2 SHEETS—SHEET 1.
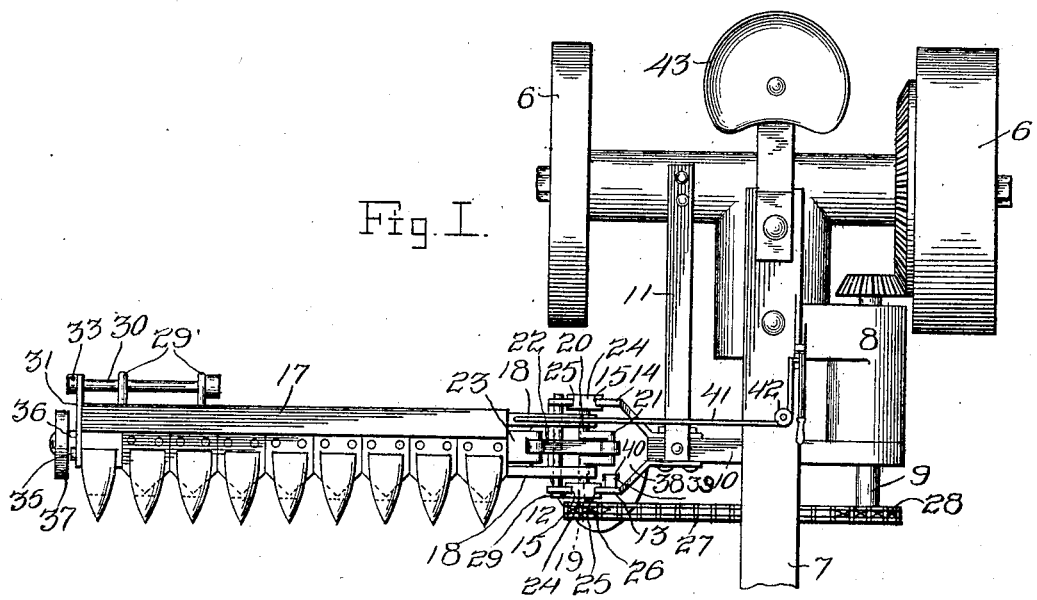
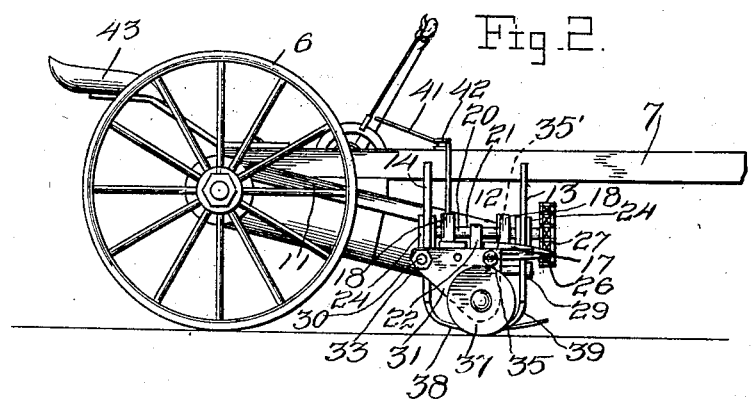
Witnesses
E. K. Reichenbach.
E. M. Bedford
Inventor
C. Lorenson.
By Chandler & Chandler
Attorneys.

No. 835,447. PATENTED NOV. 6, 1906.
C. LORENSON.
MOWER.
APPLICATION FILED APR. 8, 1905.
2 SHEETS—SHEET 2.
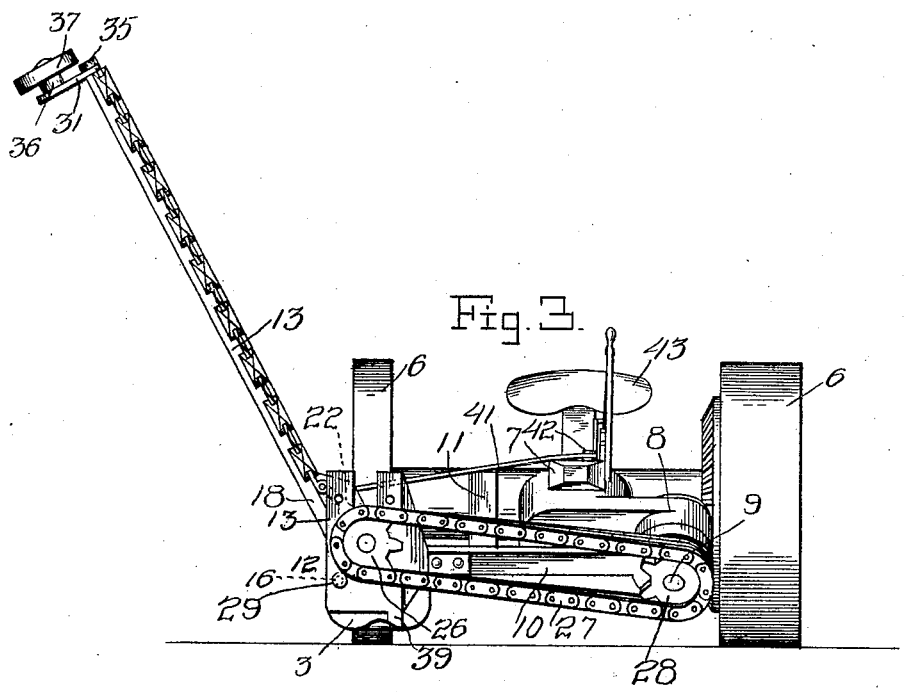
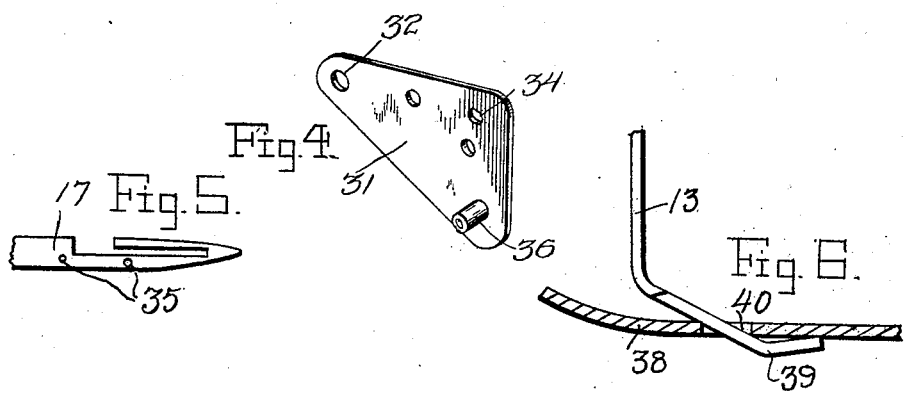

UNITED STATES PATENT OFFICE.

CARL LORENSON, OF WAUSA, NEBRASKA.

MOWER.

No. 835,447.  Specification of Letters Patent.  Patented Nov. 6, 1906.

Application filed April 8, 1905. Serial No. 254,543.

*To all whom it may concern:*

Be it known that I, CARL LORENSON, a citizen of the United States, residing at Wausa, in the county of Knox, State of Nebraska, have invented certain new and useful Improvements in Mowers; and I do hereby declare the following to be a full, clear, and exact description of the invention, such as will enable others skilled in the art to which it appertains to make and use the same.

This invention relates to farm machinery, and more particularly to mowers, and has for its object to provide a machine of this kind which will operate to cut the stalks of growing plants and which will be so arranged that the cutter-bar will be movable vertically to compensate for irregularities in the surface of the ground, the cutter-bar being so constructed that it will continue to operate during this vertical movement.

Another object is to provide a mower in which the cutter-bar will be so arranged that it may be adjusted to cut the plants at different points upon their stalks, the machine being thus especially adapted for cutting weeds in fields of low grain, the machine being arranged to cut the weeds above the grain.

Other objects and advantages will be apparent from the following description, and it will be understood that modifications of the specific construction shown may be made and any suitable materials may be used without departing from the spirit of the invention.

In the drawings forming a portion of this specification, and in which like numerals of reference indicate similar parts in the several views, Figure 1 is a top plan view of the present mower. Fig. 2 is a side elevation showing an end view of the cutter-bar. Fig. 3 is a front view showing the outer end of the cutter-bar raised. Fig. 4 is a detail view of the plate which carries the grain-wheel. Fig. 5 is a detail showing the end of the cutter-bar. Fig. 6 is a detail showing the connection of the tongue with the shoe.

Referring now to the drawings, the present invention comprises a frame provided with ground-wheels 6 and having a forwardly-extending draft-pole 7. The frame includes a laterally-offset portion 8, in which there is journaled a longitudinally-extending shaft 9, which is connected with one of the ground-wheels for operation thereby.

Extending laterally from the forward end of the offset portion 8 and in a direction opposite to that in which this portion is offset there is an arm 10, through which the shaft 9 passes, and this arm is braced by a longitudinally-extending rod 11, connected therewith and with the rearward portion of the frame.

A metallic supplemental frame 12 is secured to the outer end of the arm 10 and includes longitudinally-spaced front and rear walls 13 and 14, respectively, these walls having registering vertically-extending slots 15 therein, which open through their upper edges, and the walls are provided with vertically-extending series of spaced perforations 16 at opposite sides of their slots. A cutter-bar 17 is provided, including the usual finger-bar and reciprocatory knife-bar and having spaced wings 18 at its inner end, and these wings extend between the walls 13 and 14 and have registering bearings 19 therein, in which there is journaled a crank-shaft 20, the crank 21 of this shaft lying between the wings and being connected, by means of a short link 22, with the inner end of the reciprocatory knife-carrying member 23 of the cutter-bar for operation of the latter when the crank-shaft is revolved.

The end portions of the crank-shaft 20 extend beyond the wings 18 and project through the slots 15, these end portions being revolubly engaged in pillow-blocks 24, which are slidably engaged in the slots 15 for vertical movement, these pillow-blocks having grooves 25 in their edges, in which the portions of the walls 13 and 14 at the sides of the slots are engaged.

The crank-shaft 20 carries a sprocket 26 at its forward end, and this sprocket is connected, by means of a chain 27, with a sprocket 28, carried by the forward end of the shaft 9, so that rotation of this shaft results in operation of the cutter-bar. It will be readily seen that by reason of the above-described arrangement the free end of the cutter may be moved vertically to compensate for unevenness of the ground over which the machine is traveling, and the pillow-blocks 24 may be moved vertically, and therewith the cutter-bar, to vary the position of the cutter-bar with respect to the ground, the cutter being held against downward movement of its inner end portion below the level of its outer portion by means of a rod 29, engaged in a pair of the alining openings 16 below the cutter-bar, the outer end of the cutter-bar being supported by a means to be now described.

Secured to the rearward face of the cutter-bar 17 there are a pair of brackets 29', which have a rod 30 engaged therein extending longitudinally of the cutter-bar and lying behind the latter. This rod extends beyond the free end of the cutter-bar and is threaded for the reception of a nut 33. A metallic plate 31 is provided and is disposed against the free end of the cutter-bar. This plate has an opening 32 adjacent to its rearward edge and in which the end of the rod 30 is removably engaged, the plate being movable pivotally on this rod, and the nut 33 is engaged with the rod outwardly of the plate to hold the latter in position. A perforation 34 is formed through the plate adjacent to its forward edge, and a screw 35 is engaged in this perforation and is removably engaged in the end of the cutter-bar, and this screw is adapted for interchangeable engagement in a series of threaded apertures 35', formed in the end of the cutter-bar, to hold the plate 31 at different points of its pivotal movement upon the rod 30.

A spindle 36 extends outwardly from the plate 31 and has a grain-wheel 37 revolubly mounted thereon, this grain-wheel projecting below the plate 31 for engagement of the ground, and by reason of the adjustment of the plate described in the foregoing the grain-wheel may be moved to support the free end of the cutter-bar at different distances from the ground to correspond with the adjustment of the inner end of the cutter-bar. It will be understood that the wheel 37 is used only when the mower is employed in cutting weeds, as mentioned above, the wheel being removable to permit the plate 31 to rest against the ground in the manner of the usual drag when the machine is used as a harvester for grain or other product.

The wall 14 of the supplemental frame has a forwardly-extending and upwardly-curved plate 38 at its lower edge, which projects beyond the wall 13, thus acting as a guard for this frame and the parts mounted therein to prevent their being struck by stone or other obstructions in the path of the machine, and to support this guard-plate a downwardly and rearwardly extending tongue 39 is formed upon the wall 13 and extends through the opening 40 in the plate 38, the tongue being turned to rest against the under surface of the plate.

A cable 41 is secured at one end to the cutter-bar and is passed around a pulley 42, mounted upon the draft-pole 7, and this cable is connected with the hand-lever in such a way that the latter may be moved to raise and lower the cutter-bar, as will be readily understood. A seat 43 is provided for the machine and is located adjacent to the hand-lever, so that the latter may be operated from the seat.

What is claimed is—

1. In a machine of the class described, the combination with a wheeled frame, of guides carried by the frame, pillow-blocks mounted in the guides for vertical movement, a crank-shaft journaled in the pillow-blocks, a cutter-bar pivotally connected at its inner end with the crank-shaft to permit movement of the cutter-bar vertically, said cutter-bar carrying a reciprocatory knife-bar, operative connection between the crank of the shaft and the knife-bar for simultaneous operation thereof, means for moving the cutter-bar pivotally, said cutter-bar being movable bodily with the pillow-blocks in a vertical plane, means for varying the downward movement of the cutter-bar with the pillow-blocks and an adjustable support for the outer end of the cutter-bar.

2. A machine of the class described comprising a wheeled frame, a laterally-extending supplemental frame carried by the first-named frame, said supplemental frame including spaced walls having alining vertical slots therein, said walls also having vertical series of alining perforations, pillow-blocks slidably mounted in the slots for vertical movement, a shaft journaled in the pillow-blocks and having a crank between its ends, a cutter-bar having spaced wings at its inner end disposed with its wings in the supplemental frame, said wings having bearings therein in which the shaft is revolubly engaged, said cutter-bar including a reciprocatory knife-bar, a link connected with the crank and with the knife-bar for operation of the latter when the shaft is revolved, connections between the shaft and one of the wheels of the frame for rotation of the shaft when the wheel is revolved, a vertically-adjustable supporting-wheel removably connected with the outer end of the cutter-bar and a rod arranged for interchangeable engagement in the alining perforations of the vertical series for the reception of the cutter-bar thereupon to hold the latter at different points of its vertical movement.

3. In a mower, the combination with a frame of a laterally-extending supplemental frame carried thereby, said supplemental frame including front and rear walls, a forwardly-extending upwardly-curved plate carried by the lower end of the rear wall, a supporting-finger carried by the front wall and engaged in the plate, a cutter-bar mounted in the supplemental frame for bodily and pivotal vertical movement and means for operating the cutter-bar.

In testimony whereof I affix my signature in presence of two witnesses.

CARL LORENSON.

Witnesses:
 E. L. BRIDGES,
 OLOF OLSON.